(12) United States Patent
Karanfilov

(10) Patent No.: US 6,538,810 B1
(45) Date of Patent: Mar. 25, 2003

(54) SINGLE CELL ISOLATION APPARATUS AND METHOD OF USE

(76) Inventor: Christopher I. Karanfilov, 1412 Havencrest Ct., Columbus, OH (US) 43220

( * ) Notice: Subject to any disclaimer, the term of this patent is extended or adjusted under 35 U.S.C. 154(b) by 72 days.

(21) Appl. No.: 09/696,089

(22) Filed: Oct. 26, 2000

(51) Int. Cl.[7] ............................................. G02B 21/26
(52) U.S. Cl. ...................... 359/391; 359/392; 359/393; 359/394; 359/395
(58) Field of Search ................................. 359/391, 392, 359/394, 395, 396, 397, 398; 310/324, 330, 331

(56) References Cited

U.S. PATENT DOCUMENTS

| | | | | |
|---|---|---|---|---|
| 5,231,877 A | * | 8/1993 | Henderson | 257/414 |
| 5,427,975 A | * | 6/1995 | Sparks et al. | 216/2 |
| 6,445,109 B2 | * | 9/2002 | Per.cedilla.in et al. | 310/324 |

* cited by examiner

Primary Examiner—Mohammad Sikder
(74) Attorney, Agent, or Firm—Kremblas, Foster, Phillips & Pollick

(57) ABSTRACT

A single cell isolation apparatus is provided having a base plate with at least one micromachined well therein, a micromachined membrane, and a housing for holding the other components of the apparatus. The apparatus also may include a gel deposited above the base plate, a second membrane intermediate the base plate and the gel, and a filter above the gel, with the micromachined membrane being above the filter. Each micromachined well associated with the apparatus has a tapered sidewall, with the upper diameter corresponding to the average size of the type of cell attempting to be isolated through the use of the apparatus, and a lower diameter which is less than the upper diameter. The gel component of the apparatus is a nitrocellulose gel. The filter is permeable to cellular products, and preferably is fabricated from paper. The second membrane provides fluid for the gel necessary for maintaining the gel's physical properties.

20 Claims, 2 Drawing Sheets

SINGLE CELL ISOLATION APPARATUS AND METHOD OF USE

BACKGROUND OF THE INVENTION

1. Field of the Invention

The present invention relates generally to a single cell isolation apparatus in the form of a microscope slide, and more particularly to one for advantageous use in immunology applications, especially with respect to manipulation and handling of all biological cell types.

2. Description of Related Art

In the field of modern medicine, lab work and research often requires the use of a single cell. One such example of the type of work which requires a single cell is limiting dilution cloning (LDC). The purpose of LDC is to successfully isolate a single cell for each well in a microplate. While cloning by definition seeks to make a population of cells arise from a single cell, LDC can also be used to determine the frequency of a given event.

In LDC, a population of cells suspended in nutrient rich media is systematically diluted such that the concentration of cells per vial is reduced by factors of ten. For example, if an original cell population contains $1 \times 10^6$ cells per 1 ml of media, $10 \mu L$ of the solution is removed and placed into 1 ml of media. While theoretically the new concentration of cells should be $1 \times 10^5$ cells per ml, this is not always the case, and the problem can be exacerbated if the process of dilution is repeated several times. Statistically speaking, the chances of a "single hit" event, i.e. an event that requires only a single occurrence, like the growth of a single cell in a well, actually occurs 27% of the time based on experimental results although theoretically it should occur 100% of the time. In other words, if a dilution series is properly designed and carried out, 27% of the cultures will be positive, even though each well originally supposedly contained on average 1 cell per well.

Further complicating the situation is the fact that normally a single well may contain an average of 3–10 cells. This gives rise to the formation of a colony of cells. While an individual may be trying to isolate 1 specific type of cell that may exhibit a desirable trait, a well that contains 3–10 cells makes it virtually impossible to designate which cell is best for a particular application. A mathematical derivation and theoretical discussion associated with the above discussion is set forth in Mishell and Shiigi's "Selected Methods in Cellular Immunology."

While microscope slides have existed for centuries, only fairly recently have they been used as a single cell isolation apparatus. Even so, the results up to this time point out the need for improvement. It is thus apparent that the need exists for a microscope slide which enables the effective isolation of a single cell. Moreover, based upon the size of the cells expected to be isolated using this invention, it would also be desirable for a single slide to permit a plurality of single cells to be isolated in distinct locations.

BRIEF SUMMARY OF THE INVENTION

There is disclosed a single cell isolation apparatus having a base plate with at least one micromachined aperture formed therein, a micromachined membrane having a tapered micromachined well sidewall, and a housing for holding the other components of the apparatus. The apparatus also may include a gel deposited above the base plate, a second membrane intermediate the base plate and the gel, and a filter above the gel, with the micromachined membrane being above the filter.

Each micromachined well associated with the apparatus has a tapered sidewall. The tapered sidewall has a upper diameter which corresponds to the average size of the type of cell attempting to be isolated through the use of the apparatus, and a lower diameter which is less than the upper diameter. In at least one embodiment of the invention, the tapered sidewall has a upper diameter of 15 $\mu$m. Generally, the tapered sidewall has a lower diameter of 1 $\mu$m, and in fact in the embodiment mentioned in the preceding sentence, the lower diameter of the tapered sidewall is 1 $\mu$m.

The gel component of the apparatus is a nitrocellulose gel. The filter is permeable to cellular products, and preferably is fabricated from paper. The second membrane provides fluid for the gel necessary for maintaining the gel's physical properties. The base plate preferably is a microscope slide.

There is also disclosed a microscope slide having at least one micromachined aperture drilled therein and with a transparent micromachined membrane having a tapered sidewall having an upper diameter and a lower diameter, with the upper diameter being greater than the lower diameter. In at least one embodiment, the tapered sidewall has a upper diameter of 15 $\mu$m. Further, in at least one embodiment, the tapered sidewall has a lower diameter it of 1 $\mu$m.

There is also disclosed a method for isolating a single cell comprising the steps of: (1) depositing a population of cells suspended in media onto the upper surface of a single cell isolation apparatus, with the single cell isolation apparatus having at least one micromachined well, wherein each micromachined well has a tapered sidewall, with each tapered sidewall having a upper diameter and a lower diameter with the lower diameter being less than the upper diameter, and (2) subjecting the single cell isolation apparatus to a vacuum, thereby holding a single cell in place in each well. Preferably, the upper diameter corresponds to the average size of the type of cell attempting to be isolated. The method also includes the additional step of washing away the free floating cells, with the free floating cells being those which are not being held in place in each well by the vacuum.

One objective of this invention is to provide a single cell isolation apparatus to permit the efficient isolation of a single cell.

Another objective of this invention is to provide a unique method for the holding of a single cell in place using a vacuum.

Another objective of this invention is to provide a single cell isolation apparatus which would permit a plurality of single cells to be isolated at the same time.

Still another objective of this invention is to provide an efficient method for isolation of single cells.

Other aspects and advantages of the instant invention will be appreciated from the following description, drawings, and the appended claims.

DETAILED DESCRIPTION OF THE INVENTION

Figure 1:
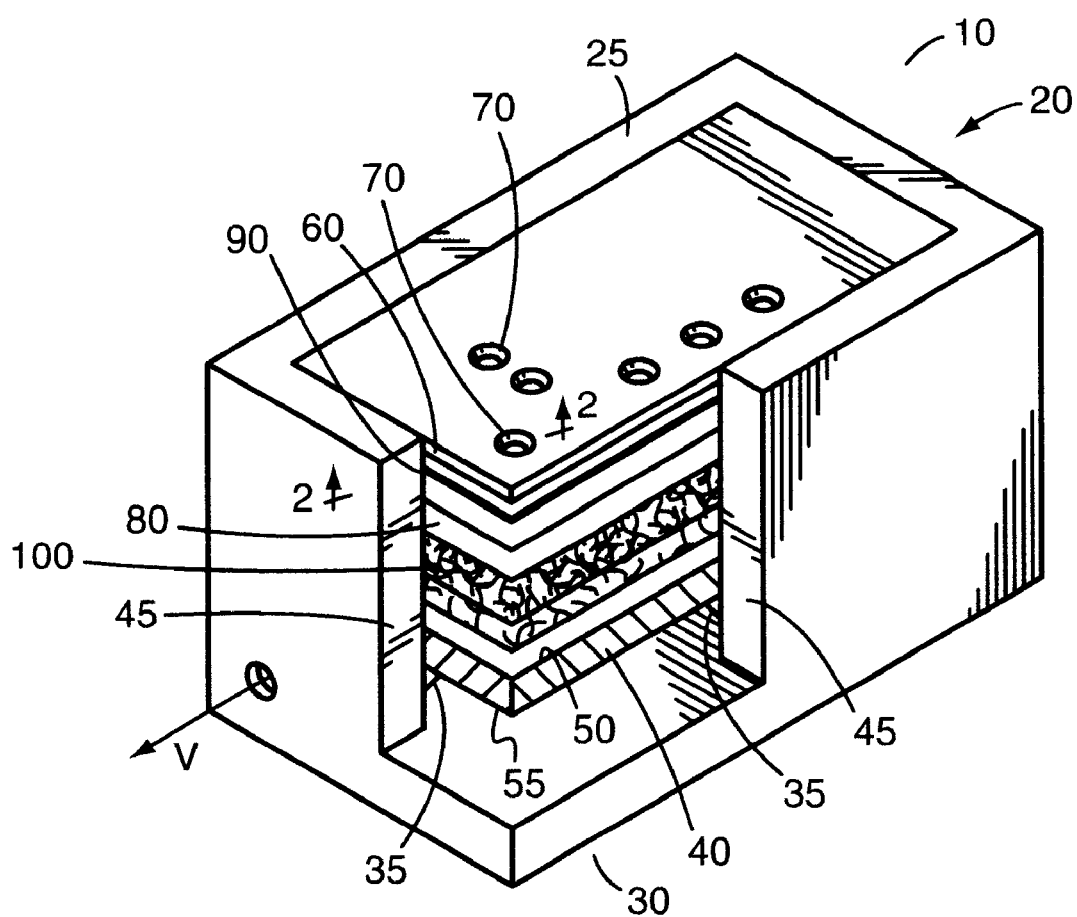
FIG. 1 discloses a perspective view of a single cell isolation apparatus on a greatly enlarged scale made in accordance with the invention.

Having reference to the drawings, attention is directed first to FIG. 1 which shows a perspective view of a single cell isolation apparatus on a greatly enlarged scale made in accordance with the invention, with the apparatus being generally disclosed by the numeral 10. The apparatus has a housing 20 having a top 25 and a bottom 30. The housing 20 has a support means 35 for a base plate 40. In FIG. 1, this support means is shown as a ledge or flange which extends inwardly from the sidewall 45 of the housing 20.

The base plate 40 is preferably a microscope slide made in accordance with this invention. The slide has at least one aperture drilled therethrough from its top 50 to its bottom 55, with there preferably being a plurality of such apertures. At the top of the cell isolation apparatus 10 is a first membrane 60, with the membrane having formed therein at least one micromachined well 70 and preferably a plurality of such wells. Preferably, the first membrane is transparent.

Figure 2:
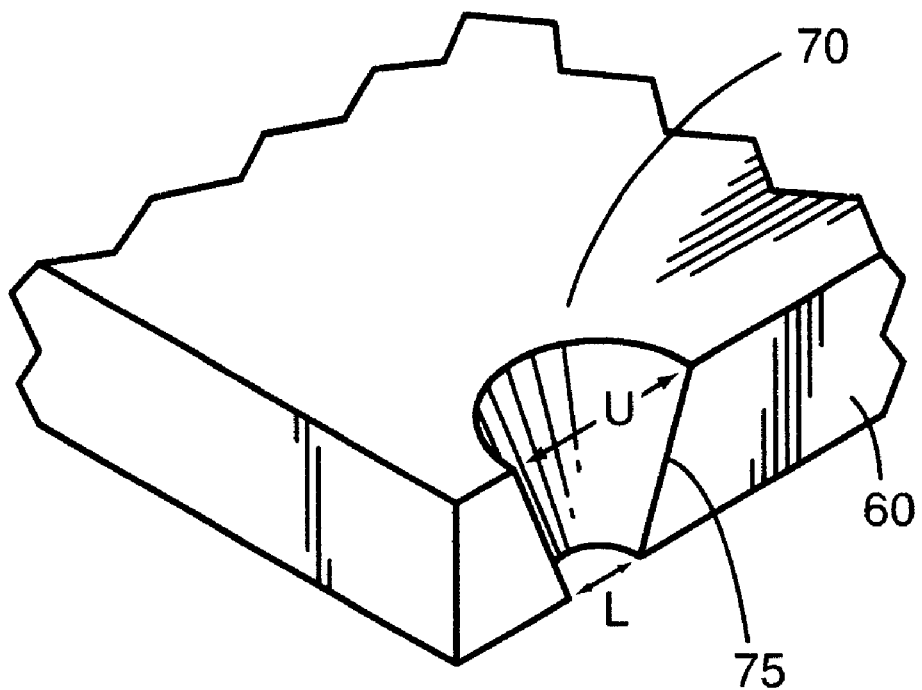
FIG. 2 discloses a perspective view on a greatly enlarged scale of the first membrane showing an individual micromachined well taken along line 2—2 of FIG. 1.

It may be appreciated by a comparison of FIGS. 1 and 2 that each of the micromachined wells is formed having a tapered sidewall 75. These micromachined wells are formed by laser using known technology. Each tapered sidewall has an upper dimension or diameter U and a lower dimension or diameter L. The upper dimension is selected to correspond to the average size of the type of cell attempting to be isolated through the use of the apparatus. Meanwhile, the lower diameter is less than the upper diameter and preferably is 1 $\mu$m.

For example, in at least one embodiment of the invention, the tapered sidewall has a upper diameter of 15 $\mu$m. Generally, the tapered sidewall has a lower diameter of 1 $\mu$m. By way of further example, in the embodiment of the invention utilized to isolate T and B cells, which cells have an average size of 15 $\mu$m and 8 $\mu$m respectively, the upper diameter preferably is 15 $\mu$m and the lower diameter is 1 $\mu$m. Although specific diameters have been utilized for purposes of the above examples, it should be remembered that different cells have different diameters. Thus, depending on the type of cell to be subjected to isolation using this invention, the upper diameter could range from 10–100 $\mu$m and the lower diameter could range from 1–10 $\mu$m.

In the embodiment of the invention shown in FIG. 1, above the base plate 40 is a nitrocellulose gel 80 which can absorb cellular products which have been secreted by the isolated cell once it is retained in the corresponding well. The gel component 80 permits additional analysis of the isolated cell to be conducted using gel electrophoresis.

A filter 90, permeable to cellular products, and preferably fabricated from paper, is positioned intermediate the first membrane 60 and the gel 80. It should be permeable to cellular products. Finally, the second membrane 100 is positioned intermediate the base plate 40 and the gel 80. This second membrane 100 is sponge-like and provides fluid for the gel 80 necessary for maintaining the gel's physical properties.

The single cell isolation apparatus of this invention also permits utilization of an efficient method for isolating a single cell. In the first step, a population of cells suspended in media is depositing onto the upper surface of a single cell isolation apparatus, with the single cell isolation apparatus having at least one micromachined well. Each micromachined well has a tapered sidewall, with each tapered sidewall having a upper diameter which corresponds to the average size of the type of cell attempting to be isolated, and a lower diameter which is less than the upper diameter. The single cell isolation apparatus is subjected to a vacuum V, with the vacuum being below the base plate near the bottom of the housing. The vacuum is pulled down through the wells as well as through the base plate, thereby holding each isolated single cell in place in each well. Other free floating cells thus can be washed away.

The present invention thus provides a single cell isolation apparatus and method for using such an apparatus which efficiently isolates a single cell, especially T and B cells. Using the method of the invention guarantees 100% isolation of one cell per well.

The apparatus of this invention can be easily and relatively cheaply assembled due to its being made with many existing components, except for the unique base plate and transparent membrane. Furthermore, due to the structure of this invention, viewing of a flat transparent membrane can easily be accomplished, unlike in traditional plates.

Furthermore, in one of its embodiments it can also be used to analyze certain secreted cellular materials by means of gel electrophoresis.

Still further, due to the nature in which the cell to be isolated is held in place, the cell isolation technique of this invention allows for basal and apical secretions to be isolated. Heretofore, the ability to isolate just one of such secretions apparently has not been accomplishable using preexisting cell isolation techniques. The use of a tapered well in conjunction with a vacuum, now permits this type of isolation. One example of where this type of isolation would find use could be with respect to certain cells of the gastrointestinal tract, where one side of the cell secretes an acidic secretion while the other side secretes a basic secretion.

Still further, some cell isolation techniques utilize antigen-antibody complexes which can lead to possible unwanted activation of certain cellular mechanisms. The apparatus of this invention obviates this problem without causing harm to the isolated cell.

Finally, while properly done LDC previously has taken about three weeks time to complete, with the apparatus and method of this invention, cell isolation can be accomplished in less than one hour.

While the single cell isolation apparatus and method of using such apparatus herein described constitutes the preferred embodiment of the invention, it is to be understood that the invention is not limited to this precise form of single cell isolation apparatus or method of using such apparatus and that changes may be made therein without departing from the scope of the invention which is defined in the appended claims.

What is claimed is:

1. A single cell isolation apparatus comprising:
   a base plate for receiving a media from which a biological cell is isolated, said base plate having at least one micromachined aperture formed therein,
   a first membrane with at least one micromachined well, wherein said well holds said isolated cell in place, and
   a housing for holding said base plate and said first membrane in said apparatus.

2. The apparatus according to claim 1, which includes
   a gel deposited above said base plate,
   a second membrane intermediate said base plate and said gel, and
   a filter above said gel, said micromachined membrane being above said filter.

3. The apparatus according to claim 1, wherein each said micromachined well has a tapered sidewall.

4. The apparatus according to claim 3, wherein said tapered sidewall has a upper diameter which corresponds to the average size of the type of cell attempting to be isolated, and a lower diameter which is less than said upper diameter.

5. The apparatus according to claim 3, wherein said tapered sidewall has a upper diameter of 15 μm.

6. The apparatus according to claim 4, wherein said tapered sidewall has a lower diameter of 1 μm.

7. The apparatus according to claim 5, wherein said tapered sidewall has a lower diameter of 1 μm.

8. The apparatus according to claim 2, wherein each said micromachined well has a tapered sidewall, said tapered sidewall having a upper diameter which corresponds to the average size of the type of cell attempting to be isolated, and a lower diameter which is less than said upper diameter.

9. The apparatus according to claim 2 wherein said gel is a nitrocellulose gel.

10. The apparatus according to claim 2 wherein said filter is permeable to cellular products.

11. The apparatus according to claim 10 wherein said filter is filter paper.

12. The apparatus according to claim 2 wherein said second membrane provides fluid for said gel necessary for maintaining said gel's physical properties.

13. The apparatus according to claim 1 wherein said base plate is a microscope slide.

14. A single cell isolation apparatus comprising:

a base plate having at least one micromachined aperture formed therein, a first membrane with at least one micromachined well, a gel deposited above said base plate, a second membrane intermediate said base plate and said gel, a filter above said gel, said micromachined membrane being above said filter, and a housing for holding said base plate, said first membrane and said second membrane in said apparatus.

15. The apparatus according to claim 14, wherein each said micromachined well has a tapered sidewall.

16. The apparatus according to claim 15, wherein said tapered sidewall has an upper diameter which corresponds to the average size of the type of cell attempting to be isolated, and a lower diameter which is less than said upper diameter.

17. The apparatus according to claim 15, wherein said tapered sidewall has an upper diameter of 15 μm.

18. The apparatus according to claim 16, wherein said tapered sidewall has a lower diameter of 1 μm.

19. The apparatus according to claim 16, wherein said tapered sidewall has a lower diameter of 1 μm.

20. The apparatus according to claim 14, wherein said base plate is a microscope slide.

* * * * *